(12) United States Patent
Anderson et al.

(10) Patent No.: US 6,565,010 B2
(45) Date of Patent: *May 20, 2003

(54) HOT GAS ATOMIZATION

(75) Inventors: John Erling Anderson, Somers, NY (US); Lawrence E. Bool, III, Hopewell Junction, NY (US); Glenn William Arnold, Poughkeepsie, NY (US); Christopher Brian Leger, Houston, TX (US)

(73) Assignee: Praxair Technology, Inc., Danbury, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/534,452

(22) Filed: Mar. 24, 2000

(65) Prior Publication Data
US 2002/0092918 A1 Jul. 18, 2002

(51) Int. Cl.$^7$ ............................................... A62C 5/02
(52) U.S. Cl. .............................. 239/8; 239/13; 239/423; 239/422; 239/424; 239/135
(58) Field of Search .......................... 239/8, 13, 135, 239/422, 423, 424, 426, 428, 433, 434, 434.5, 427, 427.3, 427.5, 79–85

(56) References Cited

U.S. PATENT DOCUMENTS

| | | | | |
|---|---|---|---|---|
| 3,275,062 A | * | 9/1966 | Williams | 239/423 |
| 4,179,068 A | * | 12/1979 | Dombrowski | 239/13 |
| 4,604,306 A | * | 8/1986 | Browning | 219/121.47 |
| 4,988,464 A | | 1/1991 | Riley | 264/12 |
| 5,052,618 A | * | 10/1991 | Carlon et al. | 239/129 |
| 5,096,615 A | * | 3/1992 | Prescott et al. | 239/13 |
| 5,135,166 A | * | 8/1992 | Dietiker et al. | 239/8 |
| 5,230,470 A | * | 7/1993 | Rajan et al. | 239/8 |
| 5,242,110 A | | 9/1993 | Riley | 239/11 |
| 5,266,024 A | | 11/1993 | Anderson | 431/11 |
| 5,330,798 A | * | 7/1994 | Browning | 239/79 |
| 5,405,085 A | * | 4/1995 | White | 239/13 |
| 5,445,324 A | | 8/1995 | Berry et al. | 239/99 |
| 5,503,872 A | * | 4/1996 | MacKenzie et al. | 239/13 |

FOREIGN PATENT DOCUMENTS

GB 1467123 3/1977

OTHER PUBLICATIONS

"Plasma Atomization Gives Unique Spherical Powders", Metal Powder, vol. 52, No. 11, Nov., 1997, pp. 34–37.

* cited by examiner

Primary Examiner—Christopher Kim
(74) Attorney, Agent, or Firm—Stanley Ktorides

(57) ABSTRACT

A method for atomizing a fluid wherein a gas is heated with the heating facilitating the acceleration of the gas to a high velocity. The accelerated gas contacts the fluid transferring shear, pressure and inertial forces and heat to the fluid effecting efficient atomization of the fluid.

9 Claims, 5 Drawing Sheets

HOT GAS ATOMIZATION

TECHNICAL FIELD

This invention relates generally to the atomization of fluids, and is particularly useful for the atomization of highly viscous fluids such as fluids containing particulates.

BACKGROUND ART

Atomization plays an important role in many industrial processes from oil or waste combustion to ceramic powder synthesis. Most atomizers are one of three main types, pressure atomizers, two-fluid atomizers, and rotary cup atomizers. Pressure atomizers are relatively simple and inexpensive, but are easily plugged by solids and cannot handle high viscosity liquids. Two-fluid atomizers are slightly less prone to plugging, but still have difficulty handling viscous fluids and tend to be expensive to operate because of the need for high-pressure atomizing gas or steam. Rotary cup atomizers can be effective, but have the major disadvantage of being more mechanically complex.

Even for those applications for which conventional atomizers are used, the droplet size distribution can have a significant impact on the economics and efficiency of the process. There is a lower bound on the mean particle size that can be produced, and the maximum particle size can be several orders of magnitude larger than the mean particle size. Therefore, even if the mean particle size is within the specified size range for processes such as metal atomization, the larger sized particles may be outside the desired size range thus significantly lowering the process yield. Further, since heat transfer and combustion reactions are much more efficient for small particles, the large particles in the distribution result in most of the unburned hydrocarbons in combustion and incineration operations.

One problem is obtaining very small droplet size in viscous fluids. It is generally not attainable with rotary cup atomizers. Pressure atomizers are limited to droplets of about twice the size of the orifice, so physical size, pressure drop and surface tension problems make this type generally unsuitable. Two-fluid atomizers can produce tiny droplets, but only with very high pressure atomizing gas and very high gas flow ratios (mass ratio of atomizing gas to mass of liquid atomized). Ultrasonic atomizers can achieve tiny droplets, but are inherently much more complex and expensive.

Another problem is plugging of the atomizer by solid particles in the fluid. Pressure atomizers, due to the small orifice, have serious plugging problems. Many two-fluid atomizers achieve high performance at the cost of small passages and associated plugging problems.

Accordingly it is an object of this invention to provide an improved method for atomizing a fluid.

It is another object of this invention to provide a method for atomizing a fluid which can be used to effectively atomize a highly viscous fluid.

It is another object of this invention to provide an improved method for atomizing a fluid so as to generate very small droplet sizes.

It is another object of this invention to provide an improved method for atomizing a particle laden fluid without plugging.

SUMMARY OF THE INVENTION

The above and other objects, which will become apparent to those skilled in the art upon a reading of this disclosure, are attained by the present invention which is:

A method for atomizing a fluid comprising:

(A) heating a gas to a temperature of at least 300° F. to produce a hot gas;

(B) passing the hot gas through an opening to produce an accelerated hot gas stream;

(C) contacting the accelerated hot gas stream with a flow of atomizable fluid; and (D) applying shear, pressure and inertial forces from the accelerated hot gas stream to the flow of atomizable fluid and atomizing the atomizable fluid.

As used herein, the term "atomizing" means to make in the form of many droplets.

As used herein, the term "shear force" means the tangential force applied to the surface of a fluid by another fluid when the two fluids are travelling at different velocities.

As used herein, the term "inertial force" means a force exhibited by a body or fluid when it is accelerated or decelerated by other external forces.

As used herein, the term "pressure force" means the normal force acting at a point in a fluid or at a surface as a result of molecular motions.

Figure 1:
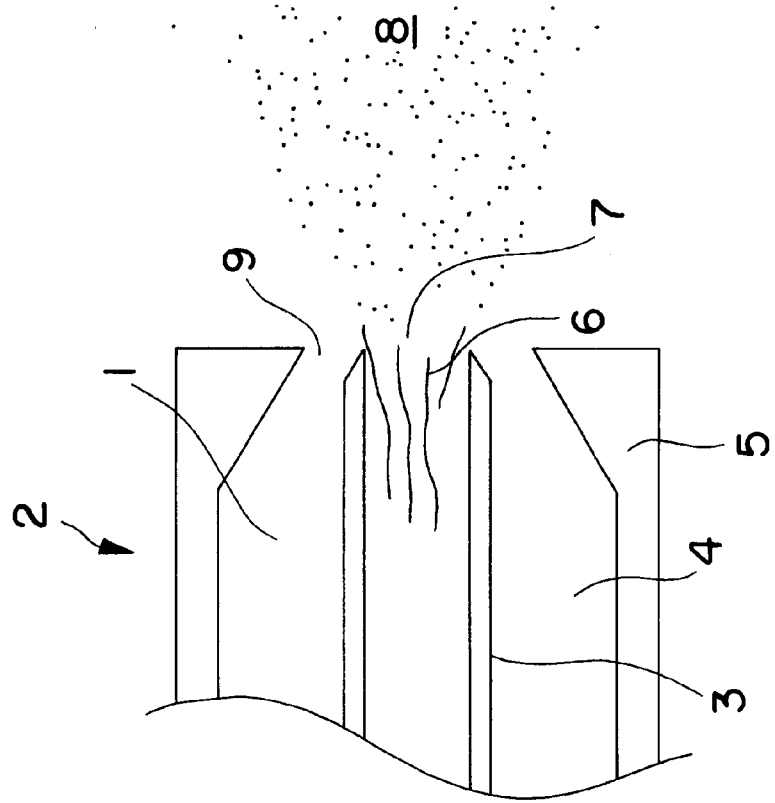
FIG. 1 is a cross sectional representation of a generalized view of the operation of the invention.

The numerals in the Drawings are the same for the common elements.

DETAILED DESCRIPTION

Figure 2:
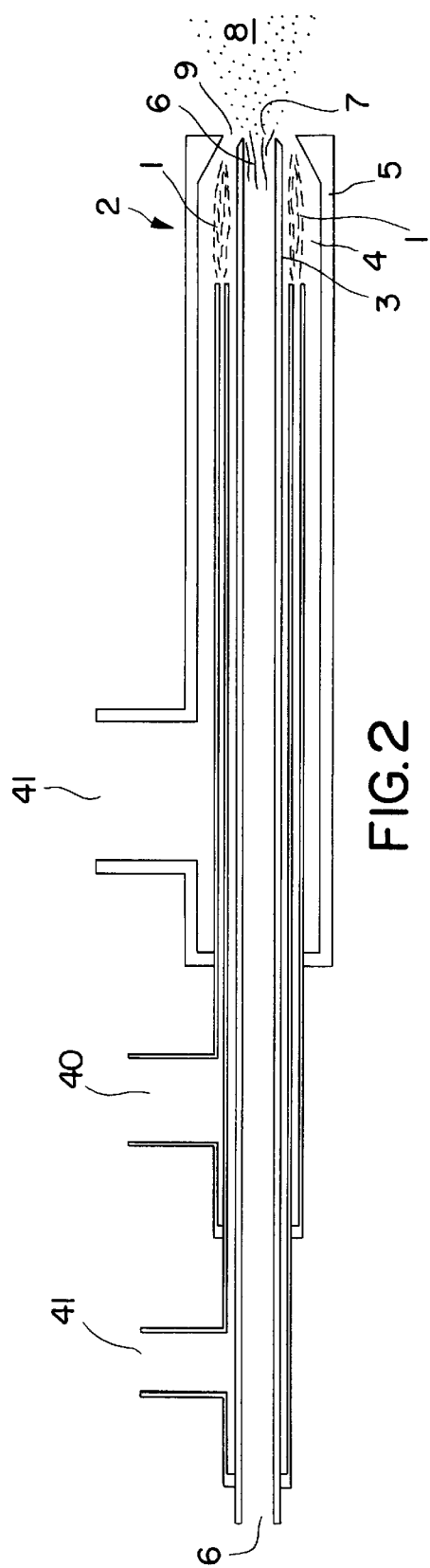
FIGS. 2–4 are cross sectional representations of preferred embodiments of the operation of the invention.
Figure 3:
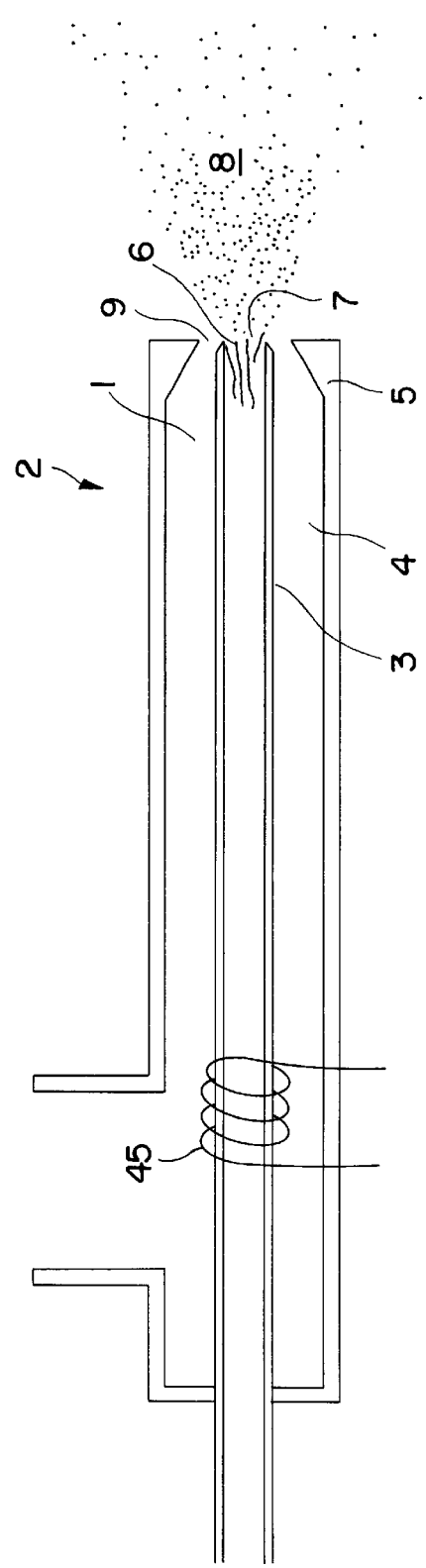
Figure 4:
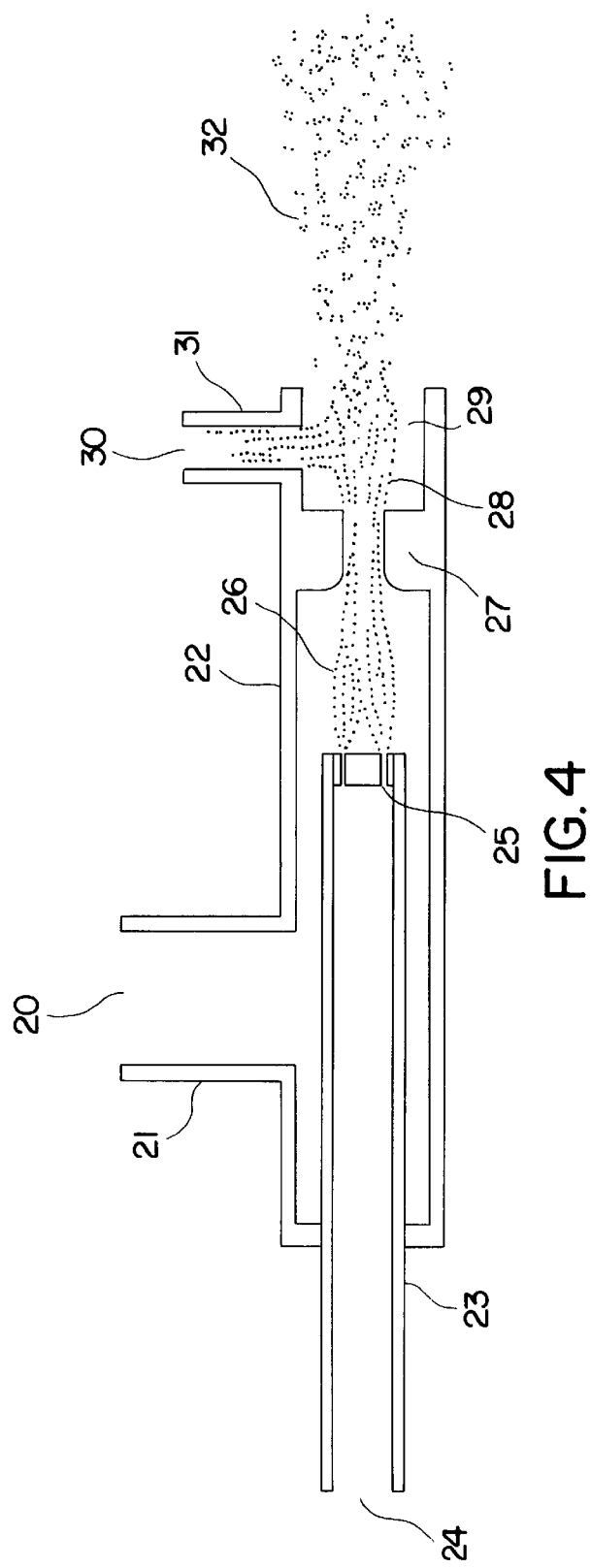
Figure 5:
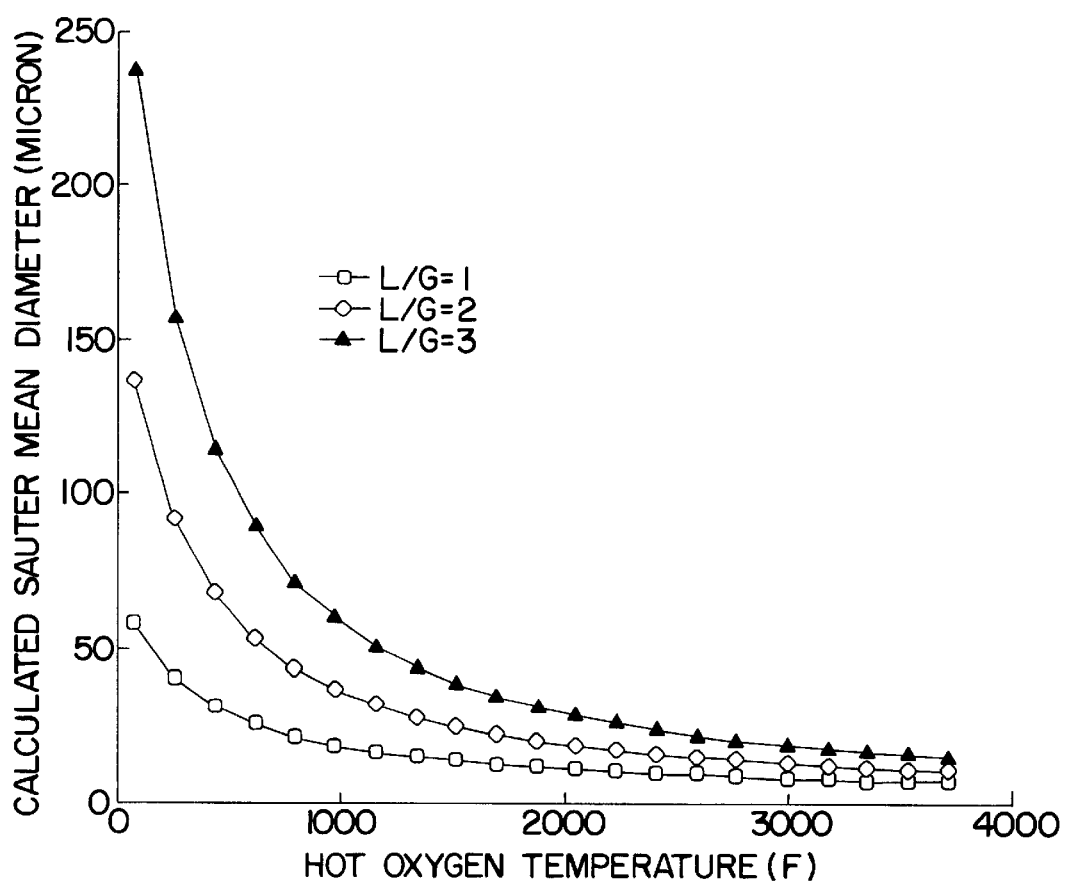
FIG. 5 is a graphical representation of the relationship of mean diameter and hot gas temperature in one embodiment of the practice of this invention.

The invention will be described in greater detail with reference to the Drawings. Referring now to FIGS. 1–3, gas 1, which is to be employed as the atomizing fluid, is heated to a temperature of at least 300° F., preferably to a temperature within the range of from 1000 to 3000° F., to produce a hot gas. The gas may be heated by any effective means such as thermal, chemical or electrical methods. For example, the heating of the gas may be accomplished with the use of a heat exchanger, a regenerator, an electrical resistance heater, or a plasma or arc heater. In the embodiment of the invention illustrated in FIG. 2, the hot gas is generated by the combustion of fuel 40 and oxidant 41. The gas may be any effective atomizing gas such as nitrogen, oxygen, argon and helium. In addition, gas mixtures such as air may be used as the atomizing gas in the practice of this invention. In the embodiment of the invention illustrated in FIG. 3 the gas is heated by means of heating coil 45.

The atomization device 2 comprises a central tube 3 and an annular passage 4 formed by outer tube 5 which is spaced from and coaxial with central tube 3. The annular passage 4 forms a chamber within which the hot gas is housed and through which the hot gas flows.

Atomizable fluid 6 passes through central tube 3 and is ejected out of the ejection passage 7 of central tube 3 into atomizing volume 8. The atomizable fluid may be a liquid or a mixture of liquid and solid particles such as a slurry. As examples of many atomizable fluids which can be used in the practice of this invention one can name industrial or waste water sludges, pastes for powder manufacture, high viscosity oils, and liquid metals. The invention will find particular utility in the atomization of otherwise hard to atomize fluids such as fluids having a high viscosity, such as a viscosity of 400 centipoise or more, although it may be used to effectively atomize less viscous fluids.

The hot gas flows within annular passage 4 coaxially with the flow of atomizable fluid 6, and then passes through nozzle or restricted opening 9. The passage of the hot gas through the nozzle or restricted opening 9 serves to accelerate the hot gas to produce an accelerated hot gas stream having a velocity generally of at least 300 feet per second (fps) greater than its initial or inlet velocity, and typically within the range of from 1000 to 6000 fps.

The accelerated hot gas stream contacts the flow of atomizable fluid, generally at an angle of up to 90 degrees, and in the process transfers energy in the form of a shear, pressure, and inertial forces from the accelerated hot gas stream to the flow of atomizable fluid. These forces cause at least some of the flow of atomizable fluid to atomize, i.e. to break off from the flow and form droplets. The mean diameter of the droplets formed using the accelerated hot gas stream in the practice of this invention will depend on the nature of the atomizable fluid but will generally be greater than 5 microns and typically within the range of from 5 to 18 microns.

The use of hot gas improves the atomization process in several ways. The nozzle equation can be used to illustrate some of these improvements.

$$U = \sqrt{\frac{2\gamma gcRTo}{M(\gamma-1)}\left(1-\frac{P}{P_0}\right)^{1-\frac{1}{\gamma}}}$$

Where:

R=gas constant $T_o$=Gas temperature

P=outlet pressure $P_0$=supply pressure

M=molecular weight of gas

γ=ratio of specific heats Cp/Cv $g_c$=gravitational constant

U=gas velocity

By raising the temperature of the gas there is achieved the same velocity using a lower supply pressure. Alternatively the supply pressure may be kept constant and there is achieved a much higher gas velocity through the nozzle. The impact of the gas velocity on fluid atomization can be seen in the following equation:

$$D_{32} = \left(\frac{585}{U}\right)\left(\frac{\sigma}{\rho_l}\right)^{0.5} + 1683\left(\frac{\mu_l}{\sqrt{\sigma\rho_l}}\right)^{0.45}\left(1000\left(\frac{L\rho_g}{G\rho_1}\right)\right)^{1.5}$$

Where:

$D_{32}$=the Sauter mean droplet diameter

σ=surface tension $\mu_l$=viscosity of the liquid $\rho_l$, $\rho_g$=density of the liquid (l) and gas (g)

L=mass flowrate of liquid

G=mass flowrate of gas

This equation is a correlation for the Sauter mean droplet diameter produced in a two fluid atomizer process. The equation was used to construct FIG. 5 for one potential application of the invention, atomization of a dilute aqueous solution by heated oxygen at a fixed supply pressure through a given nozzle. FIG. 5 plots the resulting mean droplet diameter against gas temperature for three different values of the liquid to gas ratio. FIG. 5 illustrates two important benefits of using a heated gas for atomization. If, for example, the quality of atomization is sufficient for a given process, heating the gas allows much less gas to be used to atomize a given amount of fluid. For example, if a process requires a Sauter mean diameter of 50 microns, heating the atomizing gas from room temperature to approximately 1200° F. decreases the gas requirements to approximately 33% of the original value. Alternatively heating the gas while maintaining a given liquid to gas ratio will significantly reduce the droplet size. Further, the increased forces, such as shear, pressure, and momentum forces, available by heating the gas make it possible to atomize very viscous fluids. Heat transfer from the hot gas to the atomized fluid can also be used to enhance post-atomization processes such as drying, ignition, or preventing metal solidification.

FIG. 4 illustrates another embodiment of the invention wherein the gas is heated by a combustion reaction which is particularly useful when the gas to be heated is oxygen or an oxygen-containing gas, thereby allowing the same gas source to be used not only for the formation of the accelerated hot gas stream but also for the oxidant in the combustion reaction.

Referring now to FIG. 4, oxygen containing gas 20 is provided to combustor input line 21 and then flows into the main combustor section 22. The oxygen containing gas may be air, oxygen-enriched air, or commercial oxygen having an oxygen concentration of 99.5 mole percent or more. Preferably the oxygen containing gas is a gas having an oxygen concentration of at least 21 mole percent. Passing within main combustor section 22 there is oriented fuel tube 23. Fuel 24 is provided into fuel tube 23 and passes through fuel tube 23 and out therefrom through nozzle 25 into main combustor section 22. The fuel may be any suitable fluid fuel such as natural gas, methane and propane. Within main combustor section 22 the fuel mixes with and combusts with at least some of the oxygen-containing gas to form hot combustion reaction products such as carbon dioxide and water vapor. The resulting combustion reaction within the chamber housed by main combustor section 22 results in a stream of hot gas 26 which comprises the hot combustion reaction products, any unburned fuel, and any uncombusted oxygen containing gas. Hot gas stream 26 is the hot gas used in the practice of this invention.

Hot gas passes through nozzle 27 which is employed as the opening for the production of the accelerated hot gas stream. The accelerated hot gas stream emerges from the nozzle opening as shown in FIG. 4 by stream 28 flowing within atomization volume 29. A flow of atomizable fluid 30 is provided into atomization volume 29 through fluid input conduit 31 which communicates with atomization volume 29. The nature of this conduit is such that particle laden fluids can be atomized without plugging. Within atomization volume 29 the flow of atomizable fluid 30 contacts the accelerated hot gas stream 28. In the embodiment of the invention illustrated in FIG. 4, this contact is shown as being at an angle of about 90 degrees. The contact of the accelerated hot gas stream with the flow of atomizable fluid results in the application of shear force from the accelerated hot gas stream to the flow of atomizable fluid resulting in the atomizing of at least some of the atomizable fluid, as shown by atomized spray 32.

Now by the use of this invention one can more effectively atomize fluids as well as produce atomized droplets having a smaller mean diameter than are attained with conventional methods. Although the invention has been described in detail with reference to certain preferred embodiments, those skilled in the art will recognize that there are other embodiments of the invention within the spirit and the scope of the claims.

What is claimed is:

1. A method for atomizing an atomizable liquid comprising:

(A) heating a gas to a temperature of at least 300° F. to produce a hot gas and flowing the hot gas in an annular passage coaxially with a flow of the atomizable liquid in a central tube;

(B) thereafter passing the hot gas through an opening to produce an accelerated hot gas stream having a velocity within a range of from 1000 to 6000 feet per second;

(C) contacting the accelerated hot gas stream with the flow of atomizable liquid; and (D) applying shear, pressure and inertial forces from the accelerated hot gas stream to the flow of atomizable liquid and causing at least some of the flow of atomizable liquid to break off from the flow and form droplets.

2. The method of claim 1 wherein the gas is heated to a temperature within a range of from 1000 to 3000° F.

3. The method of claim 1 wherein the atomizable liquid contains suspended solid particles.

4. The method of claim 1 wherein the accelerated hot gas stream contacts the flow of atomizable liquid at an angle of about 90 degrees.

5. The method of claim 1 wherein the accelerated hot gas stream contacts the flow of atomizable liquid at an angle of less than 90 degrees.

6. The method of claim 1 wherein the gas is an oxygen-containing gas.

7. The method of claim 6 wherein at least some of the oxygen containing gas is combusted with fuel to produce the hot gas.

8. The method of claim 1 wherein the atomizable liquid is an aqueous liquid.

9. The method of claim 1 wherein the atomizable liquid is a combustible liquid.

* * * * *